UNITED STATES PATENT OFFICE.

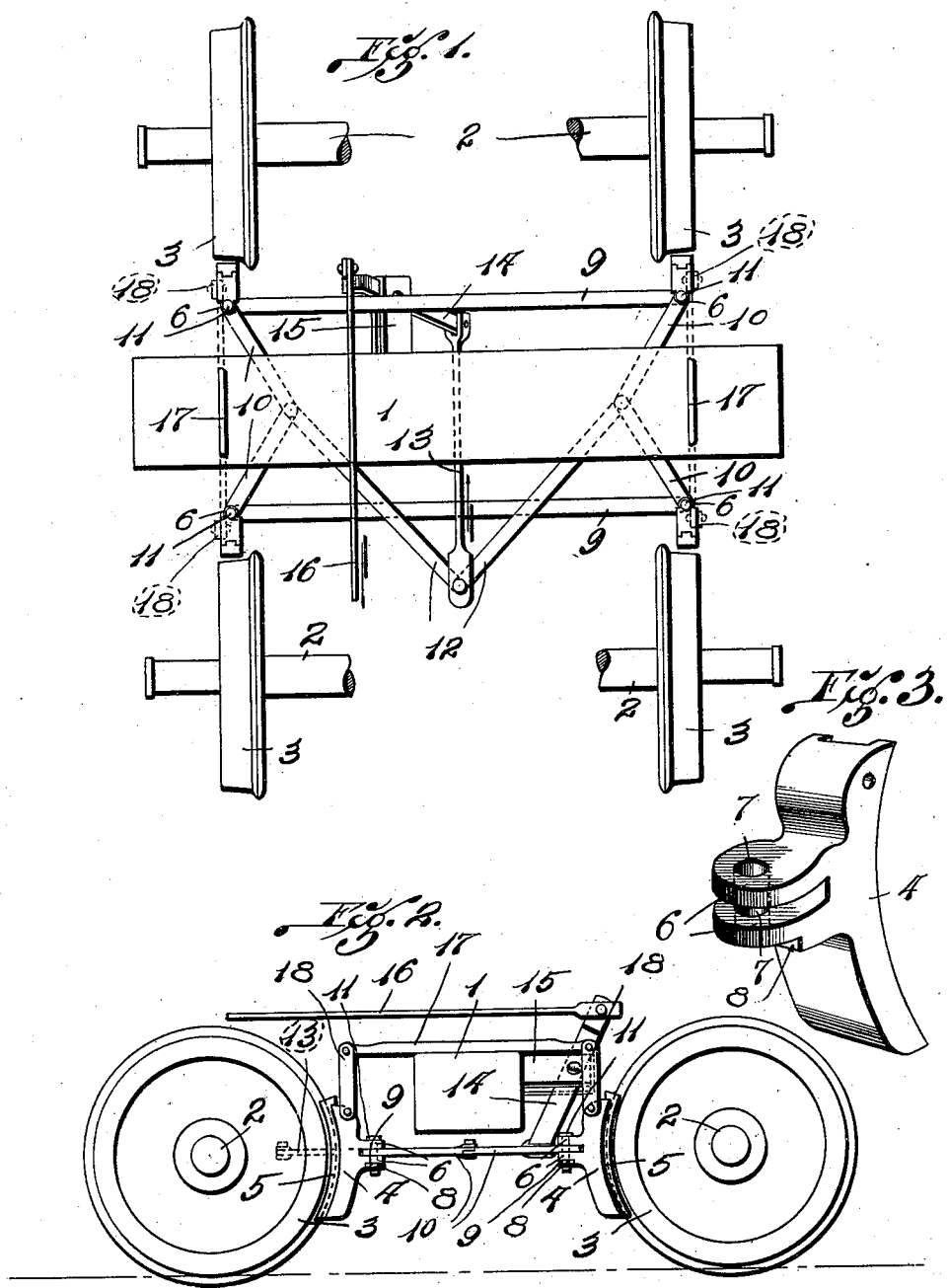

ROBERT V. PORTER, OF LONGVILLE, LOUISIANA.

CAR-BRAKE.

981,941.

Specification of Letters Patent. Patented Jan. 17, 1911.

Application filed February 7, 1910. Serial No. 542,454.

*To all whom it may concern:*

Be it known that I, ROBERT V. PORTER, a citizen of the United States, residing at Longville, Louisiana, have invented a certain new and useful Improvement in Car-Brakes, of which the following is a full, clear, and exact description, such as will enable others skilled in the art to which it appertains to make and use the same, reference being had to the accompanying drawings, forming part of this specification, in which—

Figure 1 is a plan view of a car truck equipped with a brake of my improved construction; Fig. 2 is a side elevation of a truck and showing the brake positioned thereon; Fig. 3 is a perspective view of one of the brake-heads used in connection with my improved brake.

My invention relates to a car brake of the "inside hung" type, and which is adapted for use in connection with all of the prevailing types of trucks.

One of the principal objects of my invention is to so construct and mount the brake-heads that they will automatically adjust themselves to the inclination or transverse bevel of the peripheries of the car wheels thereby obtaining the full bearing of the faces of the brake-shoes against the peripheries of said wheels.

A further object of my invention is to provide suitable means including toggle levers for uniformly moving all the brake-heads and shoes carried thereby into engagement with the car wheels.

To the above purposes my invention consists in certain novel features of construction and arrangement of parts hereinafter more fully described and claimed.

Referring by numerals to the accompanying drawings 1 designates the truck bolster, 2 the axles, and 3 the car wheels.

4 designates the brake-heads, the main body portions of which are of ordinary construction and the front faces of said body portions being adapted to receive brake-shoes 5 of ordinary form.

Formed integral with the rear side of each brake-head is a pair of horizontally disposed ears 6 through which are formed vertically alined apertures 7, and formed in the under side of the lower ear is a notch 8. The ends of transversely disposed rods 9 which perform the function of brake beams, are loosely seated in the notches 8 formed in the under sides of the lowermost ears 6, and loosely seated between the pairs of ears 6 are the outer ends of toggle links 10. Vertically disposed pins 11 pass through the apertures 7 in the ears 6 and through corresponding apertures formed in the outer ends of the rods 9 and toggle links 10, and thus the brake-heads are mounted so as to swing freely upon said pins thus permitting the brake-shoes carried by said heads to readily adjust themselves to the inclination or transverse bevel of the peripheries of the car wheels. The inner ends of the toggle links 10 are pivotally connected to one another and to the ends of a pair of links 12, the inner ends of which last mentioned links are pivotally connected to a short brake-rod 13, which extends lengthwise beneath the bolster 1. This short brake-rod is pivotally connected to the lower end of a vertically disposed lever 14 fulcrumed in a bracket 15 carried by the bolster 1, and connected to the upper end of said brake lever is the main brake rod 16.

Arranged on top of the bolster 1 are supporting bars 17, to the outer ends of which are pivotally connected the upper ends or brake hangers 18, the lower ends of which are pivotally connected to the upper portions of the brake heads 4. These brake hangers are loosely connected to the bars 17 and head 4 in order to permit said heads 4 to swing freely on their vertical pivots when the brake shoes carried by said heads adjust themselves to the peripheries of the car wheels.

When my improved brake is applied to set the shoes against the peripheries of the wheels, the rod 16 is moved lengthwise as indicated by the arrow in Fig. 1 which action swings the lever 14 upon its fulcrum, thus moving the short rod 13 in the direction indicated by the arrow in Fig. 1. This operation moves the outer ends of the links 12 outward thereby actuating the toggle links 10 to cause the outer ends thereof to spread apart, and thus the brake heads, to which the toggle links 10 are connected, are moved toward the car wheels and the shoes carried by the front sides of the heads will bear against the peripheries of the car wheels.

The peripheries of all car wheels are, to a certain degree, inclined or beveled transversely, and by my improved construction of brake heads and the manner of mounting the same, the shoes carried by the heads will readily adjust themselves to the faces or peripheries of the wheels, thus obtaining the bearing of the entire faces of each shoe against the periphery of the corresponding wheel. The double arrangement of toggle links utilized between the brake rod and the brake heads provides means whereby the power applied to the brake rod 16 is greatly multiplied and transmitted to the brake shoes when the same are applied to the peripheries of the wheels.

A car brake of my improved construction is comparatively simple, can be readily used on all prevailing types and the brake shoes carried by the brake heads which are mounted on vertical pivots, readily adjust themselves to the inclination or transverse bevel of the peripheries of the car wheels.

I claim:

1. In a car brake, a pair of transversely disposed rods, a pair of toggle links connecting the outer portions of said rods, and brake heads mounted on vertical pivots at the ends of the toggle links and transversely disposed rods.

2. In a car brake, a pair of transversely disposed rods, toggle links conjoined to the ends of said transverse rods, vertically disposed pivot pins seated in the ends of said links, and rods and brake heads on said vertically disposed pivot pins.

3. In a brake of the class described, a brake head comprising a body, a pair of horizontally disposed ears integral with the rear side of said body, there being vertically disposed alined apertures formed through said ears, and there being a notch formed in the under side of the lowermost ear.

4. In a car brake, a pair of transversely disposed rods, brake heads mounted on said rods and adapted to swing horizontally, and means whereby said rods are forced apart.

5. In a car brake, a pair of transversely disposed rods, brake heads mounted on said rods and adapted to swing horizontally, and means connected to the ends of said rods and to the heads carried thereby for forcing the same apart.

In testimony whereof I hereunto affix my signature in the presence of two witnesses, this 31st day of January, 1910.

ROBERT V. PORTER.

Witnesses:
  H. T. ROEHL,
  L. R. SCHLUNDT.